(12) United States Patent
Little et al.

(10) Patent No.: US 11,449,623 B2
(45) Date of Patent: Sep. 20, 2022

(54) FILE ACCESS CONTROL BASED ON ANALYSIS OF USER BEHAVIOR PATTERNS

(71) Applicant: Fortinet, Inc., Sunnyvale, CA (US)

(72) Inventors: Matthew J. Little, Loanhead (GB); Jamie R. Graves, Edinburgh (GB); Carson Leonard, Edinburgh (GB)

(73) Assignee: Fortinet, Inc., Sunnyvale, CA (US)

( * ) Notice: Subject to any disclaimer, the term of this patent is extended or adjusted under 35 U.S.C. 154(b) by 683 days.

(21) Appl. No.: 16/362,167

(22) Filed: Mar. 22, 2019

(65) Prior Publication Data

US 2020/0302074 A1 Sep. 24, 2020

(51) Int. Cl.
*G06F 21/62* (2013.01)
*G06F 16/182* (2019.01)
*G06N 20/00* (2019.01)
*H04L 9/08* (2006.01)
*G06F 21/60* (2013.01)

(52) U.S. Cl.
CPC ........ *G06F 21/6218* (2013.01); *G06F 16/182* (2019.01); *G06F 21/602* (2013.01); *G06N 20/00* (2019.01); *H04L 9/0819* (2013.01)

(58) Field of Classification Search
CPC .. G06F 21/6218; G06F 21/602; G06F 21/316; G06F 16/182; G06N 20/00; H04L 9/0819
See application file for complete search history.

(56) References Cited

U.S. PATENT DOCUMENTS 8,595,497 B2    11/2013  Dogu et al.
8,688,980 B2 *   4/2014  Davis .................... G06F 21/88
                                                              713/166

(Continued)

FOREIGN PATENT DOCUMENTS

CN          112491876 A    *   3/2021

OTHER PUBLICATIONS

Dale Sutherland, "Wired vs Wireless Networking", https://aberdeencybersecurity.co.uk/wired-vs-wireless-networking, Feb. 12, 2018, Aberdeen Cyber Security, 2 pages (Year: 2018).*

(Continued)

*Primary Examiner* — Carl G Colin
*Assistant Examiner* — Han Yang
(74) *Attorney, Agent, or Firm* — HDC Intellectual Property Law, LLP (57) ABSTRACT

Systems and methods for a machine-learning driven fine-grained file access control approach are provided. According to one embodiment, a server associated with an enterprise network can obtain and store information regarding historical user behavior of users of the enterprise network by observing file access requests initiated by the users. The server receives a file access request initiated by a user, which relates to a file stored within the enterprise network in encrypted form. In response to receipt of the file access request, the server determines a risk score for the user based on multiple factors, including information regarding historical user behavior, the file access request and observed data determined based on the file access request so that based on the risk score, access to the file is permitted by returning a decryption key for the file or denied by withholding the decryption key.

15 Claims, 6 Drawing Sheets

(56) References Cited

U.S. PATENT DOCUMENTS

| | | | |
|---|---|---|---|
| 8,887,274 B2 | 11/2014 | Buchanan et al. | |
| 2004/0221172 A1* | 11/2004 | Stamos | H04L 63/10 726/27 |
| 2005/0229258 A1* | 10/2005 | Pigin | H04L 63/0428 726/27 |
| 2007/0297610 A1* | 12/2007 | Chen | H04L 9/083 380/270 |
| 2011/0016534 A1* | 1/2011 | Jakobsson | H04L 67/22 726/28 |
| 2011/0126293 A1* | 5/2011 | Berengoltz | G06F 21/62 726/26 |
| 2014/0310779 A1* | 10/2014 | Lof | G06F 21/10 726/4 |
| 2016/0063227 A1* | 3/2016 | Kobres | H04L 63/08 726/3 |
| 2016/0261606 A1* | 9/2016 | Salvador | H04L 63/02 |
| 2018/0069881 A1 | 3/2018 | Graves et al. | |
| 2018/0351979 A1 | 12/2018 | Mandrychenko et al. | |
| 2019/0319945 A1* | 10/2019 | Levy | G06F 21/6218 |
| 2020/0195672 A1* | 6/2020 | Mugambi | H04L 41/142 |
| 2021/0176264 A1* | 6/2021 | Yavo | H04L 63/1416 |

OTHER PUBLICATIONS

Sue Marquette Poremba, "How a VPN Can Boost Your Security and Privacy", https://www.tomsguide.com/us/-vpn-for-beginners, news-17514.html, Oct. 29, 2018, Tom's Guide, 5 pages (Year: 2018).*
Kerr, O.S., et al. "Encryption Workarounds." The Georgetown Law Journal. vol. 106:989 2018. pp. 989-1019.
FinalCode. How FinalCode Works. http://www.finalcode.com/jp/english/about/mechanism/. 2 pgs.

* cited by examiner

FILE ACCESS CONTROL BASED ON ANALYSIS OF USER BEHAVIOR PATTERNS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security. In particular, embodiments of the present invention relate to an improved file access approach that provides access to an electronic file based on a machine-learning driven file access control mechanism including placing a cryptographic wrapper around the file to prevent access to data without performing an on-access validation of a user's rights to access the file and additionally calculating the current risk level of the user attempting to access the file based on their current and historical behavior, thereby facilitating fine-grained and dynamic access control to be applied to the user accessing the data.

Description of the Related Art

The rapid increase in implementation of network-based storage architectures have led to substantial concerns in the arena of network and information security. Major concerns relate to ensuring authentication, access control, and security of the stored data. One of the most widely used approaches to protect data within a network-based storage architecture is the use of encryption; however, encryption alone is insufficient as there are many known methods of circumventing encryption. For example, the data can be accessed by, among other things, finding an existing copy of the decryption key or a password, passcode or passphrase used to create the decryption key. See Kerr, Orin and Schneier, Bruce, *Encryption Workarounds*, 106 Georgetown L. J. 989 (2018).

Current file access control systems suffer from two key problems—either data is unprotected and individuals who have been given access once to a file are, effectively, granted access in perpetuity or access is granted for a finite period of time (e.g., during employment with a particular organization) but this mechanism is policy-driven. Policy-driven approaches require all potential user behaviors of all users within the organization to be modeled and pre-calculated and policies to be correctly developed from the predicted behaviors (e.g., user access scenarios in terms of, among other things, the time of day, the location of the user, and/or privileges associated with the user and/or a user group with which the user is associated).

Policy-driven approaches have additional limitations, including the inherent inflexible nature of predefined rules and the requirement for constant configuration and management—typically by a network administrator—when circumstances change. For example, if an employee of an organization is granted access to sensitive company data, when that employee leaves the organization, his/her access must be revoked by altering the file access control policy. Similarly, when a employee joins the organization, policies must be added for the new employee. Therefore, the organization is burdened with the overhead and potential error prone process of adding, updating, and/or deleting numerous file access control policies the complexity of which increases as the number of employees grows, as the potential user access scenarios grow, as finer-grained levels of access are defined and as the number of employees grows.

In view of the foregoing technological limitations of policy-driven file access control approaches, there is a need for a more effective file access control mechanism.

SUMMARY

Systems and methods are described for a machine-learning driven fine-grained file access control approach. According to one embodiment, a server associated with an enterprise network can obtain and store information regarding historical user behavior of users of the enterprise network by observing file access requests initiated by the users. The server receives a file access request initiated by a user, which relates to a file stored within the enterprise network in encrypted form. In response to receipt of the file access request, the server determines a risk score for the user based on multiple factors, including information regarding historical user behavior, the file access request and observed data determined based on the file access request so that based on the risk score, access to the file is permitted by returning a decryption key for the file or denied by withholding the decryption key.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for a machine-learning driven fine-grained file access control approach. As noted above, current file access control systems suffer from two key problems—either data is unprotected and individuals who have been given access once to a file are, effectively, granted access in perpetuity or access is granted for a short period of time in accordance with a policy-driven approach that does not take into account the measured risk of a user's behavior. The policy-driven approach requires all potential user behaviors to be modelled and pre-calculated and policies to be correctly developed from these predicted behaviors. As described herein, a more effective method to protect data is to use measured (rather than modelled) user behavior to determine whether access should be granted to data.

According to embodiments of the present invention, the use of cryptographic wrappers encapsulating files to prevent access to data without an on-access validation of a user's rights to access the file is combined with a near real-time calculation of the current risk level of a user based on their current and historical behavior, thereby facilitating fine-grained and dynamic access control to be applied to the user attempting to access the data. An advantage of this approach is that risk is calculated in near real-time and the required access control determination for a specific file access can be made specific to a variety of factors which are used to calculate the risk of granting the requesting user access to the file in question.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims. For example, although embodiments of the present invention are described herein with reference to protecting access to a particular type of enterprise network resource, i.e., files, the methodologies described herein are thought to be applicable to enterprise network resources more generally (e.g., network resource or shared resource accessible via an enterprise network, such as defined portions of a storage device (e.g., a network share or a directory within a file system), databases, applications, and printers), albeit, without the use of a cryptographic wrapper as in the case of files.

Terminology

Brief definitions of terms used throughout this application are given below.

The phrase "endpoint device" generally refers to a network-capable computer hardware device, typically on a Transmission Control Protocol (TCP)/Internet Protocol (IP) network. Non-limiting examples of endpoint devices include desktop computers, laptops, smart phones, tablets, thin clients, and Internet of Things (IoT) devices.

The phrase "endpoint protection system" generally refers a system that (i) focuses on protecting endpoint devices in a network from cyber threats and attacks by malicious internal and external threats, (ii) provides endpoint management functionality, for example, allowing a network administrator to identify and manage the users' computers access over a corporate or enterprise network and/or (iii) protects the enterprise network by blocking access attempts and/or other risky activity at these points of entry to the enterprise network. An endpoint protection system may proactively defend endpoints with one or more of pattern-based anti-malware technology, behavior-based exploit protection, web-filtering, and an application firewall. For example, a network administrator may configure the endpoint protection system to restrict certain website access to specific users in order to maintain and comply with an organization's policies and standards. Similarly, an endpoint protection system may provide antivirus/antimalware, sandbox protection and/or vulnerability management scanning and may additionally be configurable to remediate identified issues and/or automatically quarantine a suspicious or compromised endpoint in order to contain incidents and stem outbreaks. Non-limiting examples of endpoint protection systems include the FortiClient endpoint security solution (available from the assignee of the present invention), Cybereason, Sentinel. One endpoint security software, Stormshield SES, ForeScout CounterAct, Promisec PEM, CounterTack Sentinel, CrowdStrike Falcon Host, Guidance Software Encase, and Comodo Advanced Endpoint Protection.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various embodiments of the present disclosure, files of an enterprise network are encapsulated in a cryptographic wrapper, which protects the files by preventing direct access by users who do not have associated cryptographic keys. When a user attempts to access a file, an access request is made to a server. The server analyzes various factors using a model of user behavior developed by machine-learning techniques to identify whether the access request at issue represents abnormal behavior (that is, represents an outlier with respect to a reference dataset) and quantifies the degree of abnormality in terms of a risk score. Further discussion regarding the collection of user behavior, although, from an endpoint device and in the context of identifying a user masquerading as another user is described in US Pub. Nos. 2018/0069881 and 2018/0351979, both of which are hereby incorporated by reference for all purposes.

In one embodiment, the various factors analyzed/evaluated by the server include information regarding historical behavior of the user, the file access request at issue and observed data associated with the file access request at issue to determine a risk score. Exemplary factors can include, but are not limited to, history of general file access by the user, current location of the user, history of location of the user, time of access request, time when the user typically accesses a file, whether the user is accessing form a trusted location or an untrusted location, behavior of the user's peer group as determined by either a list obtained from a directory services server or as measured by behavior of multiple users associated with the enterprise (where users with similar behavior may be deemed to be a part of the same group). On determination of the risk score, the server that maintains the decryption key of the requested file can provide or deny the access. For example, when the risk score is low, the user can be provided the decryption key to permit access; when the risk score is moderate, the user can be directed to access the file through a lower risk channel, e.g., a virtual private network (VPN); and when the risk score is high, the user can be blocked from accessing the file.

Figure 1:
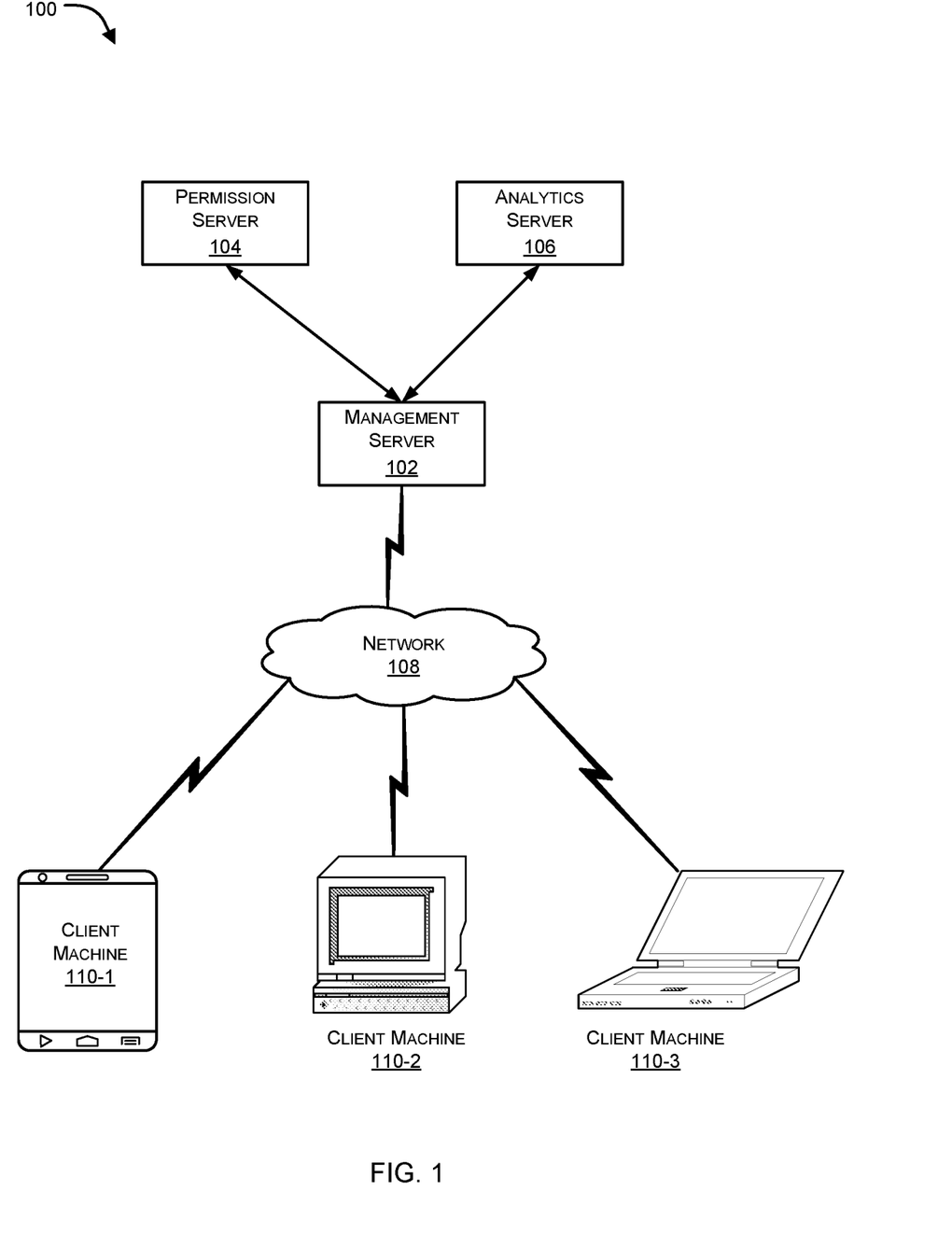
FIG. 1 is a simplified network architecture in which aspects of the present invention can be implemented in accordance with an embodiment of the present invention.

FIG. 1 is a simplified network architecture 100 in which aspects of the present invention can be implemented in accordance with an embodiment of the present invention. In the context of the present example, an improved file access approach is provided by using one or more servers, e.g., a management server 102, a permission server 104 and an analytics server 106. In an implementation, permission server 104 and analytics server 106 can be separate servers operatively coupled with management server 102, whereas, in an alternate embodiment, permission server 104 and analytics server 106 can be representative of functionality that is integrated within management server 102. In one embodiment, the servers reside within an enterprise network 108 (which may be referred to simply as network 108 hereinafter). Further, client machines 110-1, 110-2 . . . 110-N (which may be collectively referred to herein as client machines 110 and may be individually referred to herein as client machine 110) associated with network 108 represent endpoint devices though which users of the enterprise access various resources associated with network 108. Client machines 110 may can include, but are not limited to, personal computers, smart devices, web-enabled devices, hand-held devices, laptops, mobile phones and the like and generally allow users to interact with network 108 as well as external resources associated with the Internet, for example.

Those skilled in the art will appreciate that, network 108 can include one or more wireless networks, wired networks or a combination thereof that can be implemented as one of the different types of networks, such as Intranet, Local Area Network (LAN), Wide Area Network (WAN), Internet, and the like. Further, network 108 can either be a dedicated network or a shared network, representing an association of the different types of networks that use a variety of protocols, for example, Hypertext Transfer Protocol (HTTP), Transmission Control Protocol/Internet Protocol (TCP/IP), Wireless Application Protocol (WAP), and the like.

In one embodiment, client machines 110 have installed thereon a file access control module (not shown) that intercepts or "hooks" certain system Application Programming Interface (API) calls in order to perform on-access validation of a user's rights to access a file. In one embodiment, the file access control module runs in kernel mode and hooks low level operating system APIs to intercept various OS operations, such as file system input/output (I/O) activity. In this manner, the file access control module may perform appropriate user validation processing prior to performing the requested file access operation (e.g., delete, open, read, write, and/or rename) on the file. According to one embodiment, the file access control module may be integrated within an endpoint protection system installed on client machines 110. As described further below, in one embodiment, decryption keys for encrypted files stored within the enterprise network may be managed by a server associated with the enterprise network. In such an embodiment, the decryption key for a file is either returned or not responsive to the on-access validation of the file access request for the file. When the key is returned, the on-access validation process has authorized the requested file access and the file access control module uses the key to perform the requested file operation on the file. When the key is not returned, the on-access validation process has denied the requested file access and the file access control module may forego performance of the requested file operation (whether or not the decryption key is required for the file operation at issue) on the file and may additionally cause the user to be notified regarding the fact that access to the file has been denied.

According to an embodiment, management server 102 serves as an interface between a file access control module running on client machines 110 and permission server 104 and analytics server 106. For example, management server 102 may manage a validation process for a file access request received from a file access control module running on a particular client machine 110 that initiated the file access request at issue. In one embodiment, management server 102 may first communicate information regarding the file access request to analytics server 106 to obtain a risk score for the user that initiated the request. Upon receiving the risk score, management server 102 may then request the decryption key for the file at issue from permission server 104 based on the risk score. If permission server 104 provides the requested decryption key, management server 102 returns it to the requesting file access control module; otherwise, management server 102 notifies the requesting file access control module that the file access request has been denied.

In one embodiment, management server 102 can obtain and store information regarding historical user behavior of users of network 108 by observing file access requests initiated by the users via their respective client machines 110. Alternatively, such information may be stored and processed by analytics server 106. For each user, the information regarding historical user behavior can include:

Historical data regarding general file access, including one or more of:
    A number of files accessed by the user over a predetermined or configurable time period,
    Types of the files accessed over the time period, and
    Applications used by the user over the time period;
Current location of the user (as determined by the IP address of the client machine that initiated the file access request or by other means)
Historical data regarding observed locations of the user;
Time of day (local) where the file is requested; and/or
Historical data regarding observed times at which the user typically accesses files.
Whether the user is accessing data form a "trusted location" (e.g., via the corporate network or via a VPN) or from an "untrusted location" (e.g., via a public Internet hotspot)

In an embodiment, permission server 104 can receive information associated with a file access request initiated by a user, which can relate to a file stored within network 108 in encrypted form, for example, encapsulated in a cryptographic wrapper. In response to receipt of the file access request, analytics server 106 can determine a risk score for the user based on multiple factors, including information regarding historical user behavior, the file access request and observed data determined based on the file access request. The observed data can include a current location of user as determined based on a source IP address contained in the file access request and a status indicative of whether the connection through which the user initiated the file access request is trusted or untrusted. The connection can be trusted when the user is on network 108 or accessing network 108 remotely via a secure connection, while the connection can be untrusted when the user is not on network 108 or accessing network remotely 108 via an insecure connection.

In one embodiment, analytics server 106 applies machine learning techniques to the information regarding historical user behavior and the file access request at issue to determine a measure of abnormality or deviation from normal user behavior, which is referred to herein at times as a risk score. The machine learning algorithm employed by analytics server 106 may operate by building a model of user behavior. The model of user behavior may be formed in dependence on reference data (e.g., an example training set of input observations within the network environment at issue over a period of time). The model of user behavior may be formed in an unsupervised manner or may involve supervised learning with feedback. The model of user behavior may comprise a model of normal behavior, i.e., behavior which is not of a suspect nature, in dependence on normal reference data which reflects normal behavior of the users of the network environment at issue. The model of behavior may be formed in dependence on reference data collected relating to observed file access requests the network environment at issue and may be updated based on ongoing observations regarding file access requests in the network environment at issue. The machine learning algorithm may comprise a clustering algorithm which is operative to perform clustering of the reference data.

As described further below a risk score calculation algorithm (e.g., a modified outlier detection algorithm) may be configured to apply a file access request at issue (including any optional observed data associated therewith) to the model of user behavior and to determine whether or not the file access request is in accordance with the model. If the file access request is outside of that represented within the model, then a degree to which it deviates from the model behavior, which may be expressed as a risk score, may be calculated. Where the model of user behavior comprises multiple sub-models, the risk score calculation algorithm may be operative to apply the file access request to an appropriate sub-model in dependence on an identifier associated with the file access request, such as a user identifier, the name or type of the file, or an IP address. Where the model is formed in dependence on normal reference data, the file access request not being in accordance with the model may be indicative of the file access request reflecting suspect behavior. For example, where the machine learning technique comprises a clustering algorithm the risk score calculation algorithm may be operative to determine whether or not the file access falls within the scope of at least one cluster formed by the clustering algorithm. Where the file access request is not in accordance with the model, the risk score calculation algorithm may be configured to output score representing a measure of deviation from normal user behavior.

The ongoing collection and analysis of user behavior within the network environment at issue may further comprise modifying the model in dependence on observed file access requests initiated by users for files associated with the network environment. The model may thus be modified in a supervised manner. More specifically the model may be modified in dependence on alerts provided to the network administrator responsive to denying file access requests, for example. It may be advantageous to have the network administrator periodically assess whether or not the file access requests that triggered alerts actually represent suspect behavior and provide for modification of the model in dependence on the network administrator's assessment.

The ongoing collection and analysis of user behavior may therefore provide for modification of the model by way of an input-output arrangement comprised in management server 102, permission server 104 and/or analytics server 106. More specifically the ongoing collection and analysis of user behavior and/or the denial of access based on a risk score calculated based on the model of user behavior may further include prompting the network administrator by way of the input-output arrangement to modify the model. For example a message, alert or notification may be provided to the network administrator, such as on a visual display unit or an event log, and the user may be afforded an opportunity to re-classify file access requests identified as reflecting abnormal user behavior as relating to normal user behavior by way of a user operable part of the input-output arrangement such as a clickable area on the visual display unit.

The model formed by the risk score calculation algorithm may comprise multiple sub-models. Each sub-model may be separately formed from a different form of reference data. More specifically each sub-model may be formed from reference data relating to one or more of: a different file, a different type of file, a different user, a different IP address, a different location, a different timeframe.

The risk score calculation approach may comprise performing analysis in dependence on the file access request and more specifically upon application of the file access request (and associated observed data) to the model of user behavior. The analysis may provide for at least one determination to be made in respect of the nature of the suspect behavior. Analysis may determine, for example, that a file access request of the same form as the reference data, for example a file access request for the same file and by the same user, exhibits different behavior to the reference data. This may reflect the user account at issue has been compromised and is being used by someone other than the user. Alternatively, analysis may determine that a file access request fails to match or is insufficiently close to the reference data of any form in the model. This may reflect the presence of malware or may reflect the presence of an unauthorized user or an authorized user behaving in an inappropriate fashion.

In an embodiment, based on the risk score, permission server 104 can permit or deny access to the file by returning a decryption key for the file or by withholding the decryption key. In one embodiment, when the risk score is less than a first threshold, permission server 104 can return the decryption key to client machine 110 and provide full access to the file; when the risk score is between the first threshold and a second threshold, permission server 104 can return the decryption key to the client machine and provide limited access to the file; and when the risk score is greater than the second threshold, permission server 104 can withhold the decryption key. Alternatively, there may simply be one threshold risk level. For example, when the risk score is less than or equal to the threshold risk level, full access to the file is permitted by returning the decryption key to the file access control module and when the risk score is greater than the threshold risk level, access is denied by withholding the decryption key. In addition to permitting or denying a file access request, permission server 104 may also responsive to denying the request providing an output (e.g., an alert or notification to the network administrator) indicating the detection of abnormal/suspect behavior. The output may comprise a human perceptible indication that suspect behavior has been performed by a particular user. Providing an output may comprise at least one of: operation of an output device, such as providing a message on a video display unit comprised in management server 102, permission server 104 or analytics server 106.

Figure 2:
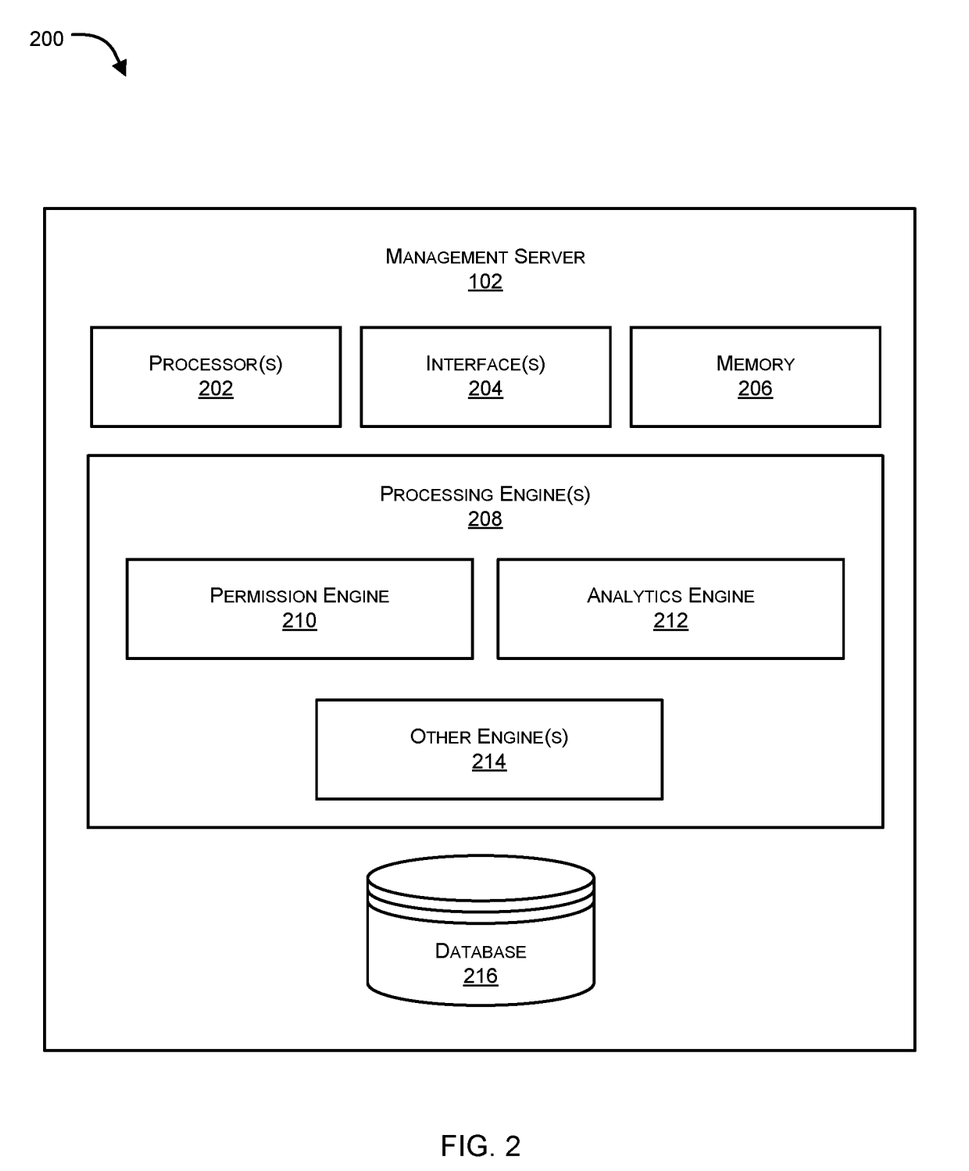
FIG. 2 illustrates an exemplary representation of functional components of a management server in accordance with an embodiment of the present invention.

FIG. 2 illustrates an exemplary representation 200 of functional components of a management server 102 in accordance with an embodiment of the present invention. As illustrated, management server 102 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 206 of management server 102. Memory 206 can store one or more computer-readable instructions or routines, which may be fetched and executed to create or share the data units over a network service. Memory 206 can include any non-transitory storage device including, for example, volatile memory such as RAM, or non-volatile memory such as EPROM, flash memory, and the like. In an example embodiment, memory 206 may be a local memory or may be located remotely, such as a server, a file server, a data server, and the Cloud.

Management server 102 can also include one or more interface(s) 204. Interface(s) 204 may include a variety of interfaces, for example, interfaces for data input and output devices, referred to as I/O devices, storage devices, and the like. Interface(s) 204 may facilitate communication of management server 102 with various devices coupled to management server 102. Interface(s) 204 may also provide a communication pathway for one or more components of management server 102 and/or facilitate interaction with the network administrator. Examples of such components include, but are not limited to, processing engine(s) 208 and database 216.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, management server 102 can include the machine-readable storage medium storing the instructions and the processing resource to execute the instructions, or the machine-readable storage medium may be separate but accessible to management server 102 and the processing resource. In other examples, processing engine(s) 208 may be implemented by electronic circuitry. Database 216 can include data that is either stored or generated as a result of functionalities implemented by any of the components of processing engine(s) 208.

In an example, processing engine(s) 208 can include a permission engine 210, an analytics engine 212 and other engine(s) 214. Other engine(s) 214 can implement functionalities that supplement applications or functions performed by management server 102 or processing engine(s) 208.

In an aspect, information regarding historical user behavior of users of an enterprise network can be collected and stored in database 216 by observing file access requests initiated by the users. In an example, the file access requests can be initiated by the users using client machines and can include or be supplemented to include information such as an IP address and geographical location of the access, time of the access, a user identifier of the accessor or user, the name of the file attempting to be accessed, and the likes.

According to an example, for each user, the information regarding historical user behavior can include historical data regarding general file access which includes one or more of a number of files accessed by the user over a predetermined period of time, types of files accessed, and applications used by the user over the predetermined period of time. The information regarding historical user behavior can further include historical data regarding observed locations of the user, as can be determined by the IP address of client machine or network device, and historical data regarding observed times at which the user accesses files, e.g., times when the file is requested, times when the user typically accesses a file, etc.

In an aspect, permission engine 210 can receive a file access request initiated by a user, which can relate to a file stored within the enterprise network in encrypted form. The encrypted form can include the file being wrapped within a cryptographic wrapper in order to prevent direct access to the file without a proper on-access validation process having been performed by the file access control module, involving validating the file access request by the file access control module via management server 102 (or one or more of management server 102, permission server 104 and analytics server 106) explicit permission is provided for authenticated access. Cryptographic keys can be stored in database 216 and can be provided by permission engine 210 for authenticated access by the user.

In response to receipt of the file access request, analytics engine 212 can determine a risk score for the user based on multiple factors, including information regarding historical user behavior, the file access request and observed data determined based on the file access request. For example, the analytics engine 212 can compare the observed data with the historical information of user behavior to determine the risk score so that the risk score can be provided to the permission engine 210. As described above, analytics engine 212 may perform the comparison by analyzes various factors using a model of user behavior developed by machine-learning techniques to identify whether the access request at issue represents abnormal behavior (that is, represents an outlier with respect to a reference dataset, such as a model of normal user behavior) and may also quantify the degree of abnormality in terms of a risk score.

According to an example, the observed data can include a current location of the user as determined based on an IP address contained in the file access request and a status indicative of whether the connection through which the user initiated the file access request is trusted or untrusted. The connection can be deemed trusted when the user is on the enterprise network or accessing the enterprise network remotely via a secure connection, e.g., via a VPN. On contrary, the connection can be deemed untrusted when the user is not on the enterprise network or accessing the enterprise network remotely via an insecure connection, e.g., a public interne hotspot.

In an aspect, based on the risk score, permission engine 210 can permit or deny access to the file by returning a decryption key for the file or by withholding the decryption key. For example, when the risk score is less than a first threshold, i.e., when the risk score is low, permission engine 210 can return the decryption key and provide full access to the file. Further, when the risk score is between the first threshold and a second threshold, i.e., when the risk score is moderate, permission engine 210 can return the decryption key and provide limited access to the file, thereby directing access to the file through a lower risk channel, e.g. a VPN. Furthermore, when the risk score is greater than the second threshold, i.e., when the risk score is high, permission engine 210 can withhold the decryption key, thereby blocking access to the file. In an implementation, the first threshold, the second threshold and the third threshold can be maintained by permission engine 210 and may be configurable by a network administrator via a browser based interface provided, for example, by management server 102. In addition to blocking access to the file, permission engine 210 may also generate an alert or notification to the network administrator regarding the detected abnormal user behavior to solicit feedback from the network administrator. In this manner, the ongoing collection and analysis of user behavior within the network environment at issue may further comprise modifying the model in dependence on observed file access requests initiated by users for files associated with the network environment and based on feedback received from the network administrator (e.g., confirming or overriding the abnormal user behavior determination regarding the file access request at issue), thus modifying the model in a supervised manner.

Those skilled in the art will appreciate that using various embodiments of the present disclosure, when any unusual or anomalous activity of the user is observed while accessing a file, the management server 102 can block the access or can provide limited access based on the risk associated with the activity. For example, if the user is accessing a file at 3:00 a.m. through a network other than the enterprise network, based on the historical user behavior, the activity can be determined to be highly risky and the user may not be provided the cryptographic key to access the file. Alternatively, when the user accesses the file during working hours using the enterprise network, the activity can be viewed as relatively normal and be assigned a low risk score and the user may be provided the cryptographic key associated with the file for full access by the user. A network administrator can simply configure permission server 104 or permission engine 210 with a rule defining under what conditions a requested decryption key is to be provided. For example, the rule may specify the requested decryption key is to be provided when the risk score is less than or equal to a predefined or configurable threshold and withheld otherwise. Advantageously in the manner, the network administrator need not contemplate all possible user access scenarios and define policies for each of such scenarios as would be required by a policy-driven file access control approach. When defining the predefined or configurable threshold, the network administrator may take into consideration the fact that user behaviors vary in different environments. For example, in a more rigid or regimented environment, such as a private network of a bank or of a defense contractor, even a slight deviation from normal user behavior may not be tolerable and therefore the network administrator in such an environment may require user risk scores to meet a lower risk threshold in order for their file access requests to be granted. In contrast, in a more flexible environment, such as a private network of a game developer, a relatively high degree of deviation from normal user behavior may be acceptable and therefore the network administrator of such an environment may permit user risk scores to meet a higher risk threshold and still authorize their file access requests. In this manner, a fine-grained and dynamic file access control mechanism is provided that overcomes various disadvantages and limitations of typical policy-based file access control approaches.

Figure 3A:
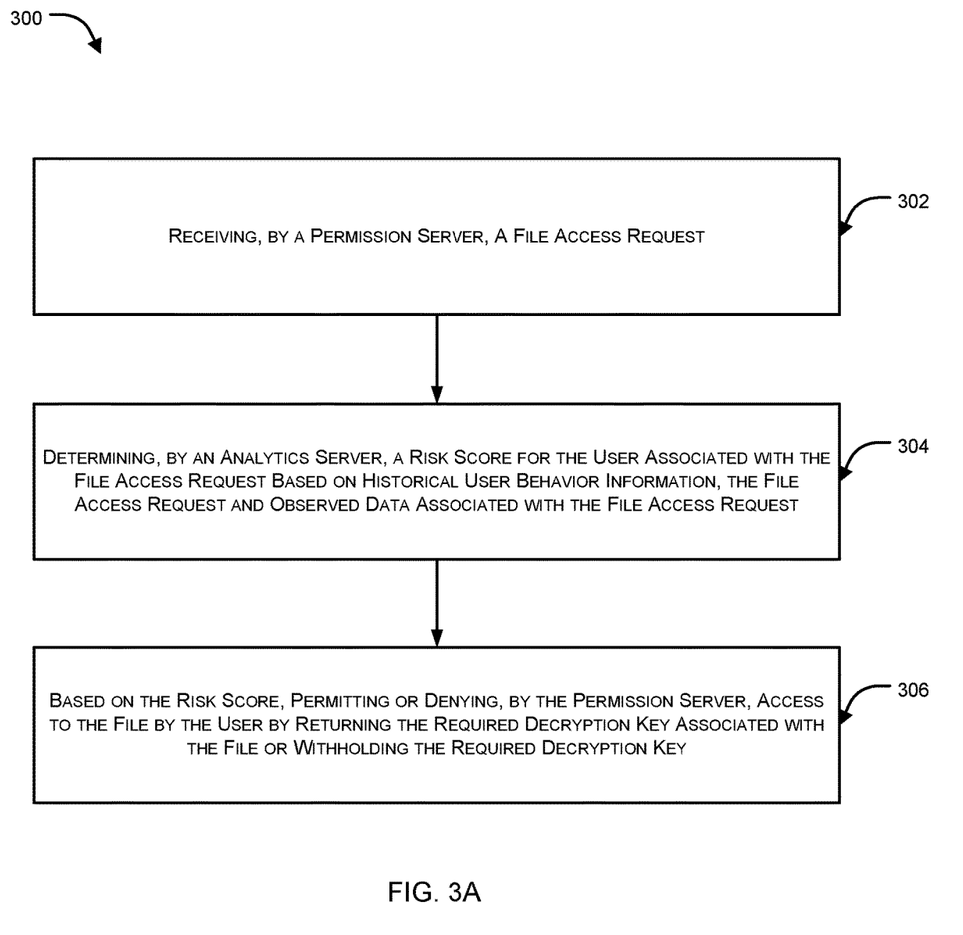
FIG. 3A is a high-level flow diagram illustrating a portion of a file access control process in accordance with an embodiment of the present invention.

FIG. 3A is a high-level flow diagram 300 illustrating a portion of a file access control process in accordance with an embodiment of the present invention. In the present example, it is assumed a user has initiated, via a client machine on which a file access control module is installed, a file access request relating to a file stored within an enterprise network in encrypted form. The file access control module has intercepted the file access request and initiates performance of an on-access validation process to seek confirmation or denial of the user's rights to perform the requested file access request (e.g., perform a file operation, such as delete, open, read, write, and/or rename) on the file.

In context of the present example, information regarding historical user behavior of the users of an enterprise network can be stored in a database associated with the enterprise network by observing file access requests initiated by the users. At block 302, a permission server can receive a file access request for validation. The file access request may represent the file access request in its original form as initiated by the user or it may represent an augmented version thereof. For example, in one embodiment, an IP address contained within the original file access request may be replaced with information regarding a geographic location associated with the IP address. Additionally, as noted above, the original file access request might be augmented to include, for example, status information indicative of whether the connection through which the user initiated the file access request is trusted or untrusted. In an example, the file can be stored in a separate server, say a file server associated with the enterprise network. In another example, the file can be stored in any network or computing device associated with the enterprise network.

In response to receipt of the file access request, at block 304, behavior analytics functionality (e.g., implemented in analytics server 106 or analytics engine 212) can determine a risk score for the user based on multiple factors, including, but not limited to information regarding historical user behavior, the file access request and observed data determined based on the file access request. The observed data can include current location of the user as determined by the IP address, a time at which the file access was requested, and information regarding whether the user is accessing the file from a trusted location or an untrusted location.

In an aspect, the analytics server can provide the risk score to the permission server, such that based on the risk score and one or more configured risk thresholds, at block 306, the permission server can cause the file access control module of the client machine to permit access to the file by returning a decryption key for the file or can cause the file access control module of the client machine to deny access to the file by withholding the decryption key.

Figure 3B:
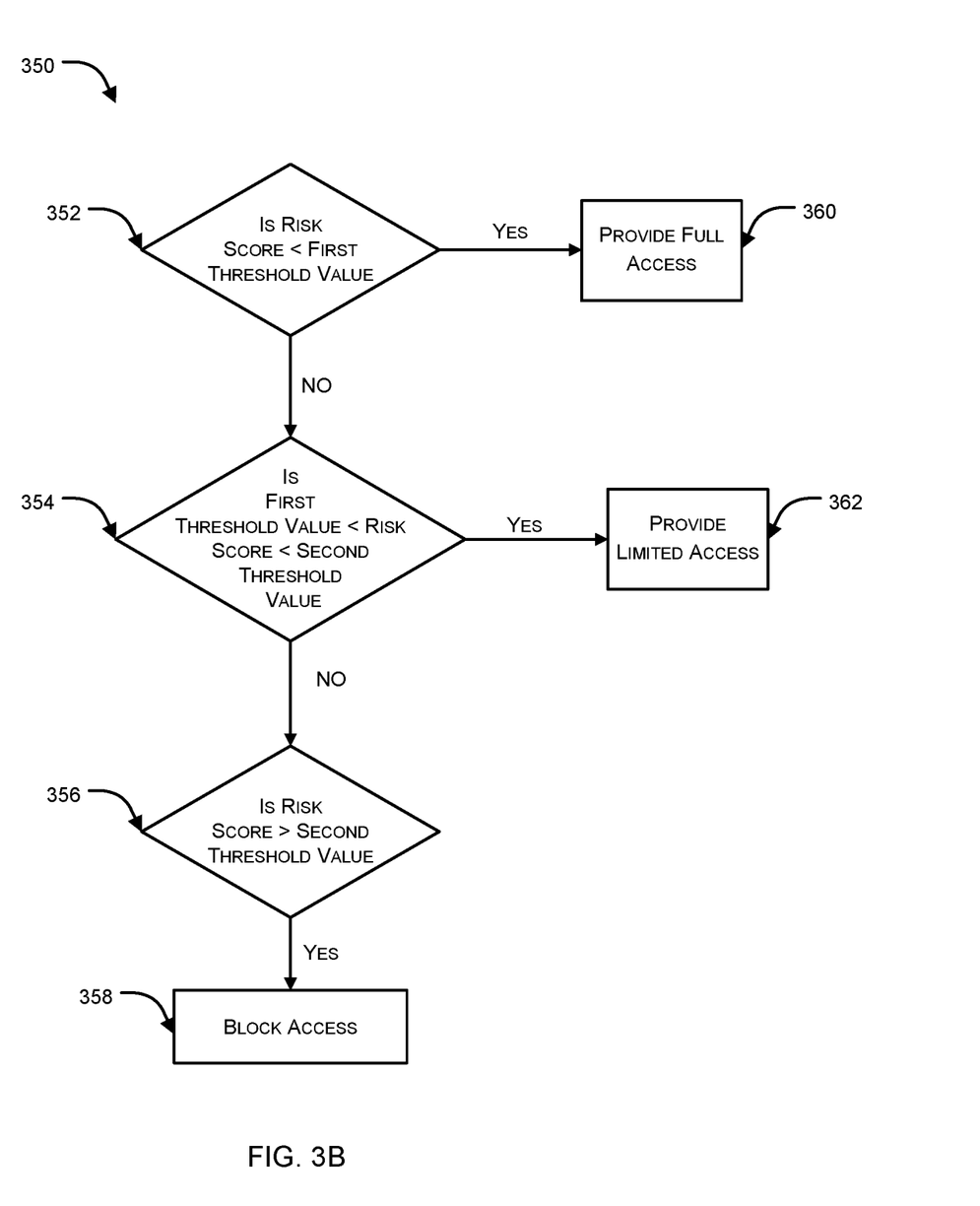
FIG. 3B is a flow diagram illustrating a user risk rating evaluation process in accordance with an embodiment of the present invention.

FIG. 3B is a flow diagram 350 illustrating a user risk rating evaluation process in accordance with an embodiment of the present invention. In the context of the present example, access to the requested file can be provided by permission functionality (e.g., implemented in permission server 104 or permission engine 210) based on the risk score determined by the behavior analytics functionality by comparing the risk score with one or more risk threshold values (e.g., a first, a second and a third threshold value in this example). The threshold values can be predetermined, preconfigured or configurable by a network administrator via a command line interface or graphical user interface provided by the permission server or by the management server.

At block 352, the risk score can be compared with the first threshold value. If the risk score is less than the first threshold, at block 360, the permission server can provide full access to the file by returning the decryption key. However, if the risk score is greater than the first threshold, at block 354, the risk score can be compared with the second threshold value. If the risk score is between first threshold value and the second threshold value, at block 362, the permission server can provide limited access to the file by returning the decryption key and specifying the limitations. If the risk score is not between the first threshold value and the second threshold value, that is, at block 356, if the risk score is greater than the second threshold value, at block 358, the permission server can block access to the file by withholding the decryption key.

Figure 4:
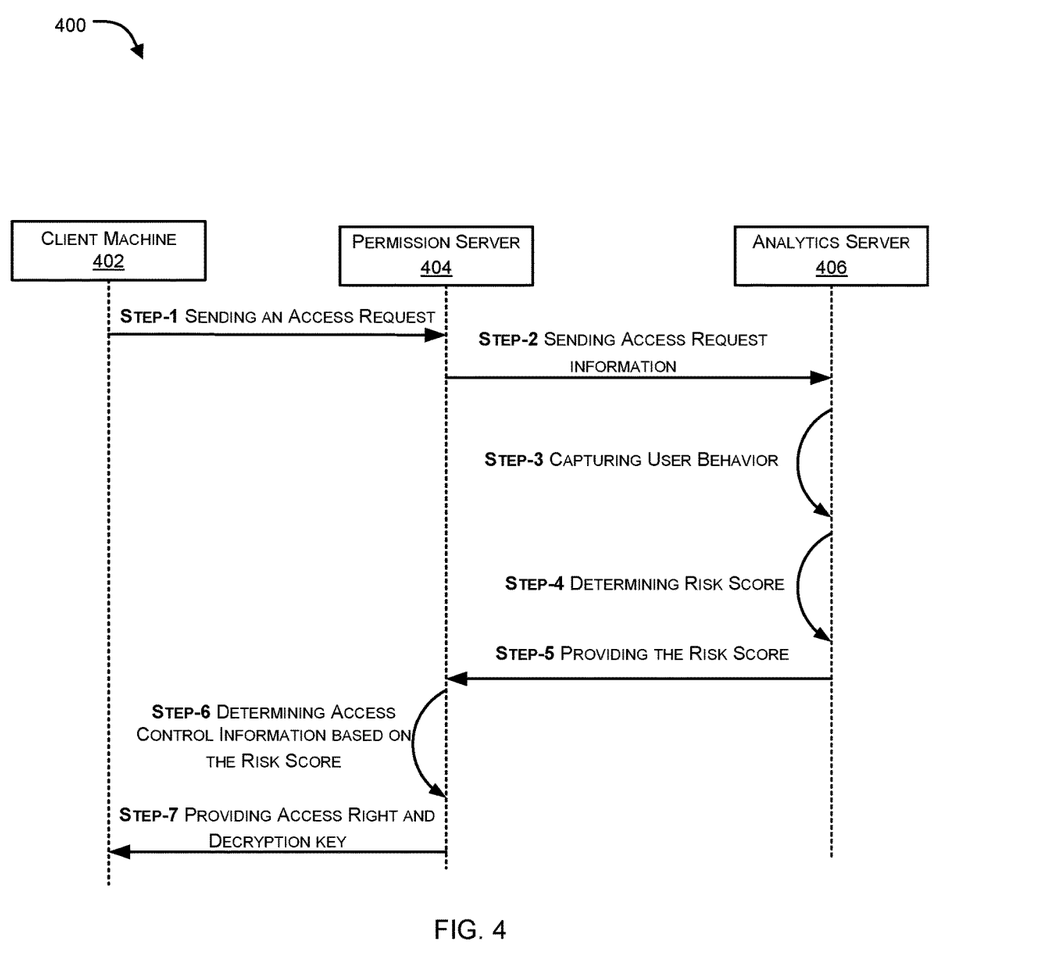
FIG. 4 is a sequence diagram illustrating interactions among various components of a network architecture in connection with a file access request in accordance with an embodiment of the present invention.

FIG. 4 is a sequence diagram 400 illustrating interactions among various components of a network architecture in connection with a file access request in accordance with an embodiment of the present invention. In context of the present example, a file access request can be initiated by a user through a client machine 402 such that at step 1, the access request can be sent to a permission server 404 for validation. As noted above, the access request can pertain to a file stored with an enterprise network in encrypted form and can include an IP address (and/or geographical location information associated with the IP address) of the client machine from which the file access request originated, a time of the access, a user identifier of the user that initiated the file access request, a name of the file to be accessed, etc. At step 2, permission server 404 can send the access request to an analytics server 406 for processing.

At step 3, analytics server 406 can capture user behavior relating to the current file access request and incorporate that information into historical user behavior information maintained by analytics server 406, including historical data regarding general file accesses by the user, historical data regarding observed locations of the user when making such file access requests, and historical data regarding observed times at which the user typically accesses files. At step 4, analytics server 406, can determine a risk score associated with the user based on the historical user behavior information, the file access request and optional additional observed data determined based on the file access request. Upon determining the risk score by analytics server 406, at step 5, the risk score can be returned to permission server 404. As noted above, the ongoing collection and analysis of user behavior within the network environment at issue (e.g., step 3) may further comprise modifying the model in dependence on observed file access requests initiated by users for files associated with the network environment.

At step 6, permission server 404 can compare the risk score with one or more threshold values, for example, the first, second and third threshold values described above with reference to FIG. 3B and permit the level of file access associated with the comparison results. For example, when the risk score is less than or equal to a particular risk threshold, a file access control rule defined by the network administrator may specify any requested file access is to be allowed. Alternatively, when the risk sore is greater than the particular risk threshold, the file access control rule may specify any requested file access is to be blocked/denied. At step 7, the access right and/or the decryption key can be provided to client machine 402. In an example, when the risk score is low, indicating, for example, a low deviation from normal user behavior, full access can be provided to the file at issue; when the risk score is moderate, indicating, for example, a moderate deviation from normal user behavior, limited access can be provided to the file at issue and when the risk score is high, indicating, for example, a high deviation from normal user behavior, access to the file at issue can be blocked by withholding the decryption key.

As noted above, the denial of a file access request by permission server 404 based on a risk score indicative of abnormal user behavior may further include logging the denial or otherwise notifying the network administrator so as to provide the network administrator with an opportunity to provide feedback to the machine-learning algorithm by reclassifying file access requests identified as reflecting abnormal user behavior as relating to normal user behavior. In this manner, the model of user behavior can be modified so as to produce more accurate risk score outputs over time based on feedback provided by the network administrator.

Figure 5:
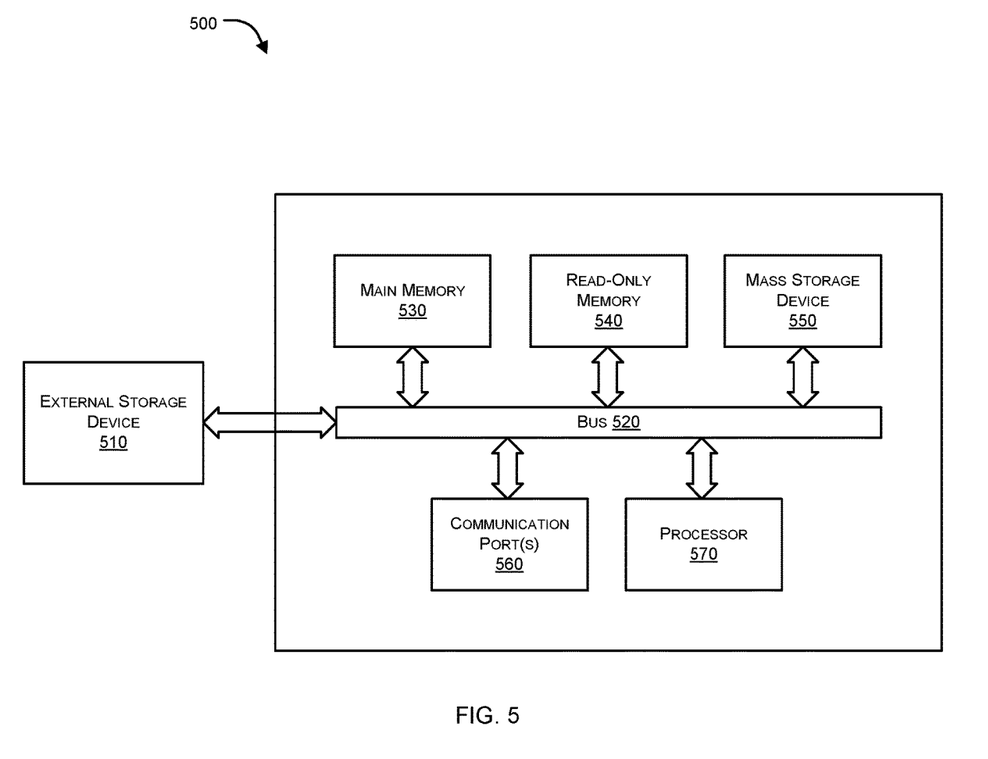
FIG. 5 illustrates an exemplary computer system in which or with which embodiments of the present invention may be utilized.

FIG. 5 illustrates an exemplary computer system 500 in which or with which embodiments of the present invention may be utilized. Computer system 500 may represent a client machine (e.g., client machine 110 or client machine 402) or a server (e.g., management server 102, permission server 104 or analytics server 106).

As shown in FIG. 5, computer system includes an external storage device 510, a bus 520, a main memory 530, a read only memory 540, a mass storage device 550, a communication port 560, and a processor 570. Computer system may represent some portion of management server 102, management server 104 or analytics server 106.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    obtaining and storing, by one or more servers associated with an enterprise network, information regarding historical user behavior of a plurality of users of the enterprise network by observing file access requests initiated by the plurality of users;
    receiving, by the one or more servers, a file access request initiated by a first user of the plurality of users, wherein the file access request relates to a file stored within the enterprise network in encrypted form;
    responsive to receipt of the file access request, determining, by the one or more servers, a risk score for the first user based on a plurality of factors, including information regarding historical user behavior, the file access request and observed data determined based on the file access request; and
    based on the risk score, permitting or denying, by the one or more servers, access to the file by returning a decryption key for the file or withholding the decryption key wherein said permitting or denying comprises:
        when the risk score is less than a first threshold, returning the decryption key and providing full access to the file;
        when the risk score is greater than a second threshold, withholding the decryption key; and
        when the risk score is between the first threshold and the second threshold, returning the decryption key and providing limited access to the file.

2. The method of claim 1, wherein said determining, by the one or more servers, the risk score for the first user comprises evaluating the file access request with reference to a model of user behavior developed by machine-learning.

3. The method of claim 1, wherein the information regarding historical user behavior includes for each user of the plurality of users:
    historical data regarding general file access, including one or more of a number of files accessed by the user over a predetermined period of time, types of the files accessed, and applications used by the user over the predetermined period of time;
    historical data regarding observed locations of the user; and
    historical data regarding observed times at which the user accesses files.

4. The method of claim 1, wherein the observed data includes a current location of the first user as determined based on a source Internet Protocol (IP) address contained in the file access request.

5. The method of claim 1, wherein the observed data includes a status indicative of whether the connection through which the first user initiated the file access request is trusted or untrusted.

6. The method of claim 5, wherein the connection is trusted when the first user is on the enterprise network or accessing the enterprise network remotely via a secure connection.

7. The method of claim 5, wherein the connection is untrusted when the first user is not on the enterprise network or accessing the enterprise network remotely via an insecure connection.

8. The method of claim 1, wherein the encrypted form involves the file being encapsulated in a cryptographic wrapper.

9. A non-transitory computer-readable storage medium embodying a set of instructions, which when executed by one or more processors of one or more servers associated with an enterprise network, causes the one or more processors to perform a method comprising:
    obtaining and storing information regarding historical user behavior of a plurality of users of the enterprise network by observing file access requests initiated by the plurality of users, wherein the information regarding historical user behavior includes for each user of the plurality of users:
        historical data regarding general file access, including one or more of a number of files accessed by the user over a predetermined period of time, types of the files accessed, and applications used by the user over the predetermined period of time;
        historical data regarding observed locations of the user; and
        historical data regarding observed times at which the user accesses files;
    receiving a file access request initiated by a first user of the plurality of users, wherein the file access request relates to a file stored within the enterprise network in encrypted form;
    responsive to receipt of the file access request, determining a risk score for the first user based on a plurality of factors, including information regarding historical user behavior, the file access request and observed data determined based on the file access request; and
    based on the risk score, permitting or denying, by the one or more servers, access to the file by returning a decryption key for the file or withholding the decryption key; wherein said permitting or denying comprises:
        when the risk score is less than a first threshold, returning the decryption key and providing full access to the file;
        when the risk score is greater than a second threshold, withholding the decryption key; and
        when the risk score is between the first threshold and the second threshold, returning the decryption key and providing limited access to the file.

10. The non-transitory computer-readable storage medium of claim 9, wherein said determining the risk score for the first user comprises evaluating the file access request with reference to a model of user behavior developed by machine-learning.

11. The non-transitory computer-readable storage medium claim 10, wherein the observed data includes a current location of the first user as determined based on a source Internet Protocol (IP) address contained in the file access request.

12. The non-transitory computer-readable storage medium claim 10, wherein the observed data includes a status indicative of whether the connection through which the first user initiated the file access request is trusted or untrusted.

13. The non-transitory computer-readable storage medium claim 10, wherein the encrypted form involves the file being encapsulated in a cryptographic wrapper.

14. A system, the system comprising:
one or more processors; and
a non-transitory computer-readable storage medium coupled to the one or more processors and embodying a set of instructions, which when executed by the one or more processors of one or more servers associated with an enterprise network, causes the one or more processors to perform a method comprising:
obtaining and storing information regarding historical user behavior of a plurality of users of the enterprise network by observing file access requests initiated by the plurality of users;
receiving a file access request initiated by a first user of the plurality of users, wherein the file access request relates to a file stored within the enterprise network in encrypted form;
responsive to receipt of the file access request, determining a risk score for the first user based on a plurality of factors, including information regarding historical user behavior, the file access request and observed data determined based on the file access request; and
based on the risk score, permitting or denying, by the one or more servers, access to the file by returning a decryption key for the file or withholding the decryption key, wherein said permitting or denying comprises:
when the risk score is less than a first threshold, returning the decryption key and providing full access to the file;
when the risk score is greater than a second threshold, withholding the decryption key; and
when the risk score is between the first threshold and the second threshold, returning the decryption key and providing limited access to the file.

15. The system of claim 14, wherein the information regarding historical user behavior includes for each user of the plurality of users:
historical data regarding general file access, including one or more of a number of files accessed by the user over a predetermined period of time, types of the files accessed, and applications used by the user over the predetermined period of time;
historical data regarding observed locations of the user; and
historical data regarding observed times at which the user accesses files.

* * * * *